United States Patent
Ruigrok

(10) Patent No.: US 9,670,006 B2
(45) Date of Patent: Jun. 6, 2017

(54) APPARATUS FOR SINGULATING PRODUCTS

(71) Applicant: Aweta G&P B.V., Nootdorp (NL)

(72) Inventor: Albertus Johannes Ruigrok, Nootdorp (NL)

(73) Assignee: AWETA G&P B.V., Nootdorp (NL)

( * ) Notice: Subject to any disclaimer, the term of this patent is extended or adjusted under 35 U.S.C. 154(b) by 0 days.

(21) Appl. No.: 14/955,288

(22) Filed: Dec. 1, 2015

(65) Prior Publication Data

US 2016/0159580 A1    Jun. 9, 2016

(30) Foreign Application Priority Data

Dec. 3, 2014    (NL) .................................... 2013911

(51) Int. Cl.
  B65G 17/24    (2006.01)
  B65G 47/24    (2006.01)
  (Continued)

(52) U.S. Cl.
  CPC .............. B65G 47/24 (2013.01); B07C 5/342 (2013.01); B65G 17/24 (2013.01); B65G 39/20 (2013.01);
  (Continued)

(58) Field of Classification Search
  CPC ........ B65G 47/24; B65G 17/24; B65G 39/20; B07C 5/02; B07C 5/342
  (Continued)

(56) References Cited

U.S. PATENT DOCUMENTS

| 3,120,889 | A | * | 2/1964 | Willsey | .................. | A01K 43/00 |
| | | | | | | 198/387 |
| 3,147,844 | A | * | 9/1964 | Mountz | .................. | A01K 43/00 |
| | | | | | | 198/458 |

(Continued)

FOREIGN PATENT DOCUMENTS

| DE | 41 18 602 | 12/1992 |
| FR | 2 412 481 | 7/1979 |
| WO | WO 2010/005309 | 1/2010 |

OTHER PUBLICATIONS

Written Opinion, Appln. No. NL2013911, dated: Dec. 3, 2014.
(Continued)

*Primary Examiner* — Mark A Deuble
(74) *Attorney, Agent, or Firm* — Marvin Petry; Stites & Harbison PLLC

(57) ABSTRACT

An apparatus for singulating products supplied in bulk, such as, for instance, fruits, potatoes, or eggs, more particularly for unround products, for instance pears or sweet peppers, comprising:
an endless conveyor which extends in a transport direction (T), wherein the conveyor is provided with at least one row, extending in the transport direction, of carriers (1a; 101a) configured such that between each two successive carriers in the row a transport position for a product is formed, wherein each carrier comprises at least one roller (4; 104), arranged on a respective axis of rotation (5a, 5b; 105);
wherein at least one of said rollers (4; 104) includes at least a first roller-section (21; 121) and an adjacent second roller-section (22; 122) having mutually different product engagement properties,
wherein at least two successive carriers in a said row of carriers include respective rollers that each include at least a first (21; 121) and a second roller section (22; 122), (Continued)

wherein the second roller sections (22; 122) of the at least two successive carriers are located at mutually different axial positions.

24 Claims, 3 Drawing Sheets

(51) Int. Cl.
  *B65G 39/20* (2006.01)
  *B07C 5/342* (2006.01)
  *B07C 5/02* (2006.01)
(52) U.S. Cl.
  CPC .......... *B07C 5/02* (2013.01); *B07C 2501/009* (2013.01); *B65G 2201/0211* (2013.01)
(58) Field of Classification Search
  USPC ........................................................ 198/779
  See application file for complete search history.

(56) References Cited

U.S. PATENT DOCUMENTS

| | | | | |
|---|---|---|---|---|
| 3,216,549 A * | 11/1965 | Niederer | ................ | A01K 43/00 198/458 |
| 3,252,561 A * | 5/1966 | Kelton | ................ | A23N 3/00 198/445 |
| 3,715,024 A * | 2/1973 | Mumma | ................ | B41F 17/34 198/387 |
| 5,181,596 A * | 1/1993 | Warkentin | ................ | B07C 5/36 198/370.05 |
| 5,195,628 A * | 3/1993 | Warkentin | ........... | B65G 47/967 198/370.01 |
| 5,651,446 A * | 7/1997 | Affeldt | ................ | B07C 5/02 198/460.1 |
| 5,855,270 A * | 1/1999 | Throop | ................ | A23N 15/00 198/387 |
| 6,148,989 A * | 11/2000 | Ecker | ................ | A23N 15/00 118/24 |
| 6,454,101 B1 * | 9/2002 | Doornekamp | ......... | A01K 43/00 198/779 |
| 7,228,958 B2 * | 6/2007 | Hendrik De Greef | | A23N 15/00 198/385 |
| 2005/0205391 A1 | 9/2005 | De Greef | | |

OTHER PUBLICATIONS

International Search Report, Appln. No. NL 2013911, Dated: Jul. 27, 2015.

Search Report, National Registration No. FR 1561798, Mailing Date: Aug. 23, 2016.

Written Opinion, National Registration No. FR 1561798, Mailing Aug. 23, 2016.

* cited by examiner

APPARATUS FOR SINGULATING PRODUCTS

The present invention relates to an apparatus for singulating products, for instance vegetables, fruit, or eggs, more particularly unround products such as, for instance, pears or sweet peppers.

WO2010/005309 discloses an apparatus for singulating products supplied in bulk, such as, for instance, fruits, potatoes, or eggs, more particularly for unround products, for instance pears or sweet peppers, comprising an endless conveyor which extends in a transport direction, wherein the conveyor is provided with at least one row, extending in the transport direction, of carriers configured such that between each two successive carriers in the row a transport position for a product is formed, with a first plane extending vertically and through the middle of the respective row of carriers. In the known apparatus, each carrier comprises two substantially cylinder-shaped rollers, of which a first is arranged on an associated first axis of rotation and a second on an associated second pivot, wherein the first and the second pivot are each located in a second plane, and wherein the first axis of rotation is situated on a first side of the first plane and the second axis of rotation is situated on a second, opposite side of the first plane. The first and the second axis of rotation each include a substantially equal acute angle with the first plane and extend from the first plane slightly obliquely upwards, with the sum of the acute angles being less than 180°.

According to WO'309, it had been found that unround products immediately find their way to a central, lower-situated middle of the transport position without further irregular rotation. Any clearly higher situated "doubles", on the one hand because of their own unstable position near the upper edge of the rollers and on the other hand because of the very stable position of the products that have already taken up their place, will, as a result of the rotating rollers, likewise immediately, try to find an upstream free transport position. Furthermore, the stable central location of the heaviest part of the product that has found its place, for instance the spherical part of a pear, makes it possible, with sensors, to do a representative measurement, for instance a recording for obtaining a spectrum to determine sugar content, water content, or acid content.

In a preferred embodiment of WO'309 the rollers consist of brushes. With this feature, damages to products such as fruit and vegetables, for instance apples, tomatoes, or peaches, can be largely prevented.

However, chances of products slipping are relatively high in case of application of brushes, which negatively affects rotation of products which may be desired during inspection of the products.

The present invention aims to improve the singulator. Particularly, the invention aims to provide an apparatus that can singulate products very efficiently and reliably, wherein the singulated products can also be inspected in a reliable manner (e.g. by a camera).

According to an aspect of the present invention this is achieved by the features of claim 1.

It has been found that an efficient and reliable singulating of the products can be achieved by at least one of said rollers including at least a first roller-section and an adjacent second roller-section having mutually different product engagement properties, wherein at least two successive carriers in a said row of carriers include respective rollers that each include at least a said first and a said second roller section, wherein the second roller sections of the at least two successive carriers are located at mutually different axial positions.

Particularly, it has been found that in this way, improved product engagement and a desired swift product (re)orientation can be achieved, compared to e.g. using brush-only rollers. Also, it has been found that in this way, very reliable product rotation can be effected after the products have found a place in one of the a transport positions provided by the rollers (the rollers preferably being rotated themselves during operation). As a result, substantially all sides of the singulated product can be inspected by e.g. a camera or other vision inspection device. Moreover, the second roller sections of said successive carriers are located at mutually different axial positions. In this way, it has been found that significantly improved product engagement can be achieved compared to a system in which subsequent second roller sections would be located at the same axial positions (i.e. in line with each other viewed along a transport direction; it was found that such a configuration could result in product ejection or misplacement).

In the present invention, a said roller may include a substantially cylindrical roller. The term "substantially cylindrical" is to be broadly interpreted, since it is not specifically limited to a roller having a fixed diameter unless specified differently. For example, a said roller may also have a conical, fruscoconical or diabolo shape, or yet another shape.

Also, in a further embodiment, a said carrier may include a single roller, or at least two rollers, e.g. located at two sides of a central vertical plane.

For example, a said first roller-section can be relatively soft roller section, for receiving and reorienting the products without damaging the products. A respective adjacent second roller-section may e.g. be relatively hard compared to that soft section, e.g. having an external surface that is relatively firm or rigid compared to an external surface of the first roller section, allowing improved product rotation.

Providing mutually different product engagement properties of the roller sections can be achieved in various ways. According to a non-limiting embodiment, a said first section of the roller may differ in at least one of the following properties with respect to a said adjacent second section of the roller: a mechanical property, hardness or compressibility or elasticity (measured in radial inward direction, radial being defined with respect to a centre line—rotation axis—of the roller), material structure, material composition, and/or another property.

According to a further non-limiting embodiment, at least circumferential product engagement surfaces of the first and second section of the roller differ. It is preferred that a difference at least leads to contours of the first and second roller-sections having a mutually different rolling resistance (in case of the roller section rolling over a contact surface, the rolling involving rotation around the axis of rotation of the roller). For example, a said second roller section may provide a higher rolling resistance (or 'rolling friction'; measured using the same test load and the same contact surface) than a rolling resistance provided by a said first roller section. A said first roller section can be configured to provide a relatively low rolling resistance, e.g. to provide product support as well as slip. Thus, improved local product drag forces and local slip sections can be achieved, leading to more reliable product rotation and orientation.

As an example, to provide relatively low grip, or slip, a said first roller-section of the at least one roller may have a low-friction outer surface, for example a surface containing or consisting of Teflon™. Similarly, this can be achieved by implementing a brush-type first roller section.

Thus, and according to a preferred embodiment, a said first roller-section of the at least one roller is a brush section.

In this way, damage to products during pickup or receiving the products can be avoided or minimized. A said brush section can be configured in many different ways, depending e.g. on the type of product to be process. For example, a brush section may include a large number of flexible (resilient)—substantially loose/bendable or mutually swivable—brush hairs, extending radially with respect to a axis of rotation of the respective roller, outer ends of the hairs defining a ring-shaped contour in case no product is engaged by the roller. The hairs may be evenly distributed, or in groups/bundles of hairs or differently, as will be clear to the person skilled in the art. As an example, a said bundle of hairs may be a slightly tapered or conical bundle, with a centre line of the bundle of hairs extending radially with respect to the axis of rotation of the respective roller.

According to an embodiment, a circumferential surface of the first roller-section of the at least one roller includes apertures, preferably located between flexible elements, for example brush hairs of groups of brush hairs. In addition, according to an embodiment, a said second roller-section of the at least one roller may include a substantially closed contour, for example a ring-shaped surface of a cylinder body. By selecting a suitable openness of the contour, respective roller section properties can be set, particularly such that receiving, orienting and subsequent rotating of a product can be optimized.

Further, it is preferred that in case a said second roller section has a higher rolling resistance (or 'rolling friction'; measured using the same test load and the same contact surface) than a rolling resistance provided by a said first roller section, the second roller section is located at or near an axially inward position of the roller (e.g. at or near a axial middle position of the roller). Particularly, that second roller section can be spaced-apart from axial end faces of the roller. In this way good product singulating results can be achieved.

Also, an aspect of the invention provides a method for singulating products, including supplying the products to an apparatus according to the invention, wherein the products are received by an upper part of said endless conveyor, the conveyor being driven in a transport direction.

In this way the above-mentioned advantages can be achieved.

Further advantageous embodiments of the invention are described in the dependent claims.

The apparatus according to the invention will be discussed in detail below, with reference to a drawing, in which:

FIG. 1 schematically depicts a side view of an apparatus according to an embodiment of the invention;

FIG. 2 gives a perspective view of part of the apparatus shown in FIG. 1;

Figure 1:
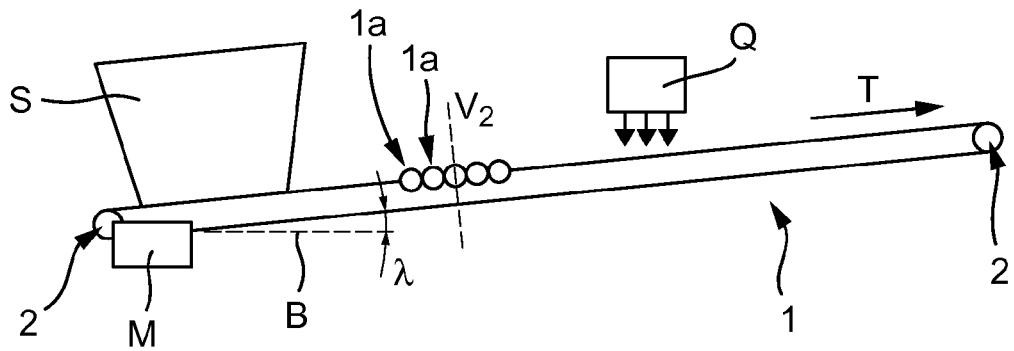

In the drawings, corresponding or similar features are denoted by corresponding or similar reference signs.

Figure 2:
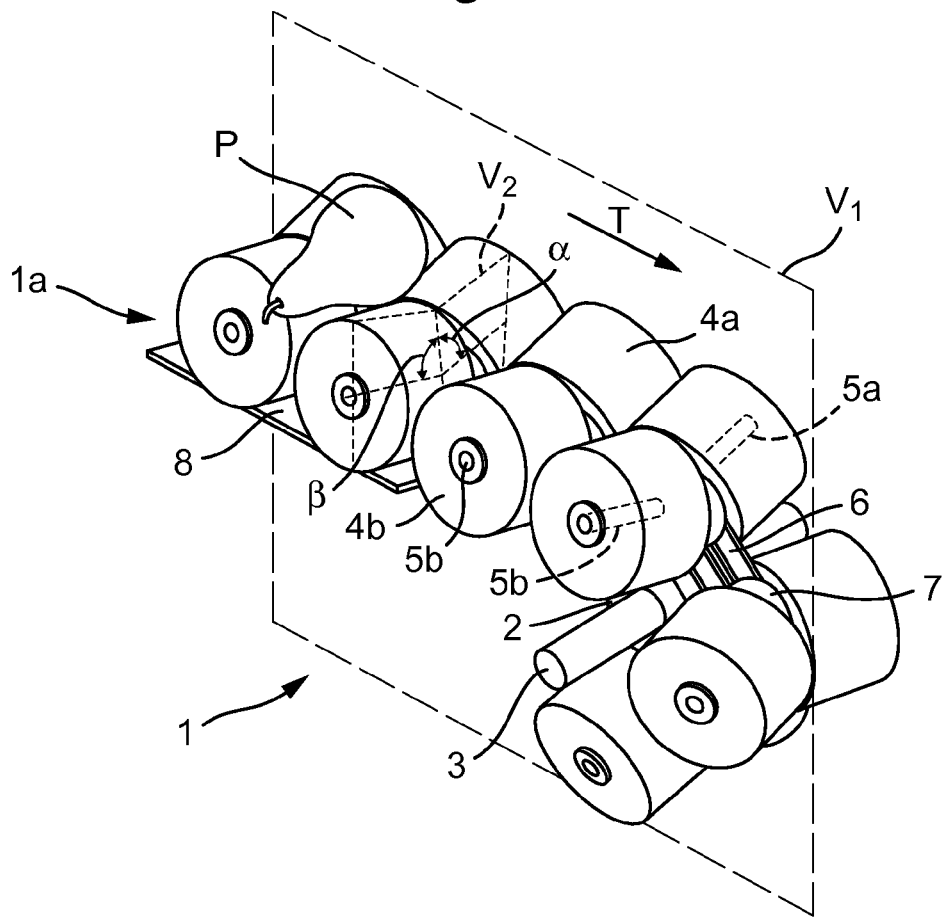

FIG. 1 schematically depicts part of an apparatus, including an endless conveyor 1 which extends in a transport direction T. In this example, said transport direction T includes a small angle λ with a horizontal plane B. The conveyor is provided with at least one row (one, in this example), extending in the transport direction T, of carriers 1a that are configured such that between each two successive carriers in the row a transport position for a product P is formed, with a first plane V1 extending vertically and through the middle of the respective row of carriers. FIG. 1 shows only part of the carriers 1a; FIG. 2 shows the carriers 1a in more detail. Particularly, the carriers 1a are located all along the endless conveyor 1, to provide an endless array of product transport positions (or "product receiving nests").

The products to be singulated can be e.g. pears (one being shown in FIG. 2), or other products. The apparatus can be used for processing unround products (vegetables, fruit, eggs, pears or sweet peppers, etc.) or substantially round products (e.g. apple, oranges, etc.).

In the exemplary embodiment according to FIGS. 1-2, with the endless roller conveyor 1 the products P, the conveyor 1 can be formed by inter alia at least one an endless chain or another endless drive member, carried by end wheels 2 with shafts 3. One (or both) of the end wheels can be driven by a drive means M, for example a motor. It will be clear to those skilled in the art how a conveyor drive for an endless conveyor can be configured, so that further details of this are not represented nor described.

In FIG. 1, a product supplier S is shown, configured for supplying products to an upper part of the endless conveyor 1. The product supply S as such can be configured in different ways, and may e.g. include a product supply conveyor, a product storage or buffer facility, a liquid or water holder containing products (e.g. floating in the liquid/water) or a product supply robot or crane, or a different product supply means. Usually, during operation, products are supplied to the endless singulating conveyor in bulk, e.g. in an unordered manner, by the product supplier S.

Downstream with respect to the product supplier S, product inspection means Q can be located for inspecting passing products P, the products P being conveyed along or through those inspecting means Q by the endless conveyor 1 during operation. In a more particular embodiment, the product inspection means Q are configured to inspect all external surfaces of each product P that passes. For aiding the product inspection means Q, preferably, the conveyor 1 is configured to rotate the products passing the inspecting means. To that aim, the conveyor carriers 1a include rotating rollers, as will be explained below in more detail with reference to FIGS. 2-4. The product inspection means Q may include for example one or more photo-detectors, one or more camera's, and/or other product imaging means, e.g. configured to produce one or more images or other detection signals, that may e.g. be process by a processing means (for example a signal processor, computer). Detection results following from a processing of such images or signals may be used in a further processing of the products, such as for grading or sorting the products, for detecting and rejecting faulty products, as will be appreciated by the skilled person.

Referring to FIG. 2, during operation, the products P are conveyed in transport positions which are formed between pairs of successive carriers 1a, the successive carriers 1a situated one after the other in the transport direction forming a said row. The conveyor 1 may be provided with several parallel rows of carriers extending in the transport direction T. In this FIG. 2, a single row is represented. Further, in all above-mentioned cases it is conventional for the products at the downstream end of the conveyor 1 to be transferred to a next conveyor (not shown), mostly a sorting unit from where the products are released e.g. onto packaging lines.

As follows from FIGS. 1-4, in this example, each of the carriers 1a includes two rollers 4a, 4b, the rollers being rotatable around respective axes of rotation 5a, 5b. FIG. 5 shows an alternative embodiment, wherein each carrier 101a includes a single roller 104.

In the present example, each carrier is formed by a first roller 4a and a second roller 4b. More particularly, these rollers 4a, 4b are cylinder-shaped. In this case, the cylinder-shape is a circle-cylinder shape, wherein a diameter of an outer circumferential surface of the cylinder is constant (viewed along axial cylinder direction). In another embodiment, the rollers have different shapes, for example conical, frusco-conical, or a diabolo-shape (see FIG. 5).

In the exemplary embodiment shown, a first roller 4a is mounted on an associated first axis of rotation 5a and the second roller 4b is mounted on an associated second axis of rotation 5b. The rotation axes 5a, 5b can be connected to conveyor drive means in various ways. In the example, the axes 5a, 5b are arranged on link elements of the endless drive member (e.g. chain) 2, in particular pivot fastening elements 7, which, furthermore, are in turn connected on both sides with conventional links 6. To those skilled in the art it will be clear that the dimensioning of the parts 4a, 4b, 6, and 7 is determinative of the size of the transport positions, or also the pitch, and hence is determinative of the size of the products P to be conveyed.

The two pivots 5a, 5b are situated on opposite sides of the row, more particularly on opposite sides of a first plane V1 which extends vertically and through the middle of the respective row of carriers, in the transport direction T. Moreover, in an embodiment, these pivots 5a, 5b of a carrier 1a may additionally be located in a second plane V2 which is perpendicular to the first plane V1. In most cases this second plane V2 is moreover perpendicular to the transport direction T. As indicated in FIG. 2, the pivots 5a, 5b, and hence also the rollers 4a, 4b, are oriented at an angle α and β, respectively, with respect to the first plane V1.

As follows from the drawing, in the first embodiment, the first 5a and the second axis of rotation 5b each include an acute angle α and β, respectively, with the first plane V1 and extend from the first plane V1 slightly obliquely upwards, with the sum of said acute angles α, β being less than 180°. In an embodiment, the acute angles α, β which the first axis of rotation 5a and the second axis of rotation 5b respectively include with the first plane V1 can be substantially equal.

Moreover, the axes 5a, 5b, viewed from the first plane V1, extend obliquely upwards, so that the angles included with the plane V1 are acute, i.e. less than 90°. Depending on the products to be processed, these acute angles have a value between 60° and the above-mentioned 90°. A preferred value for such an angle is 75°. What is realized through such a choice for the location of the axes of rotation 5a, 5b is that the transport positions comprise a recessed portion as with trays or cups. These angles may be settable, so that small differences on opposite sides of the first plane V1 are also possible, to thereby obtain more specific movements.

It should be noted that in an other embodiment (see e.g. FIG. 5), axes of rotation of the rollers 105 may extend normally with respect to a said first plane V1 (i.e. the angles included by roller rotation axes with the plane V1 is 90°).

Furthermore, the rollers 4a, 4b may rotate, for example by passing them over a driving track 8 (shown in FIG. 2), or in a different manner. Such driving tracks 8 are known in this area of the art. The tracks 8 may be driven, or also stand still, being pressed against the rollers 4a, 4b and causing the rollers 4a, 4b to rotate through friction between the track surfaces and roller surfaces. With combinations of speeds of the chain 2 and of the track 8, with additional combinations on the left and right, that is, rollers 4a and separately therefrom rollers 4b, all possible movements can be obtained.

This transport can proceed in a substantially horizontal plane, but in an alternative embodiment it is possible for transport to proceed with a slight rise (as in FIG. 1). What is thus achieved is that in a situation of several products being in the same transport position, rolling back in upstream direction is promoted.

Preferably, the rotation axes 5a, 5b are located in a plane perpendicular to the transport direction T. This simplifies assembly of parts and positioning of drive tracks 8.

Furthermore, for particular applications, the rollers 4a, 4b may each be driven separately, for instance for the purpose, in case of delicate products, of driving only those rollers where such is necessary, so that the other products are left alone.

In a known embodiment of the apparatus, which embodiment is not part of the present invention, the rollers 4a, 4b consist of brushes. With this feature, damages to products such as fruit and vegetables, for instance apples, tomatoes, or peaches, can be largely prevented.

Figure 3:
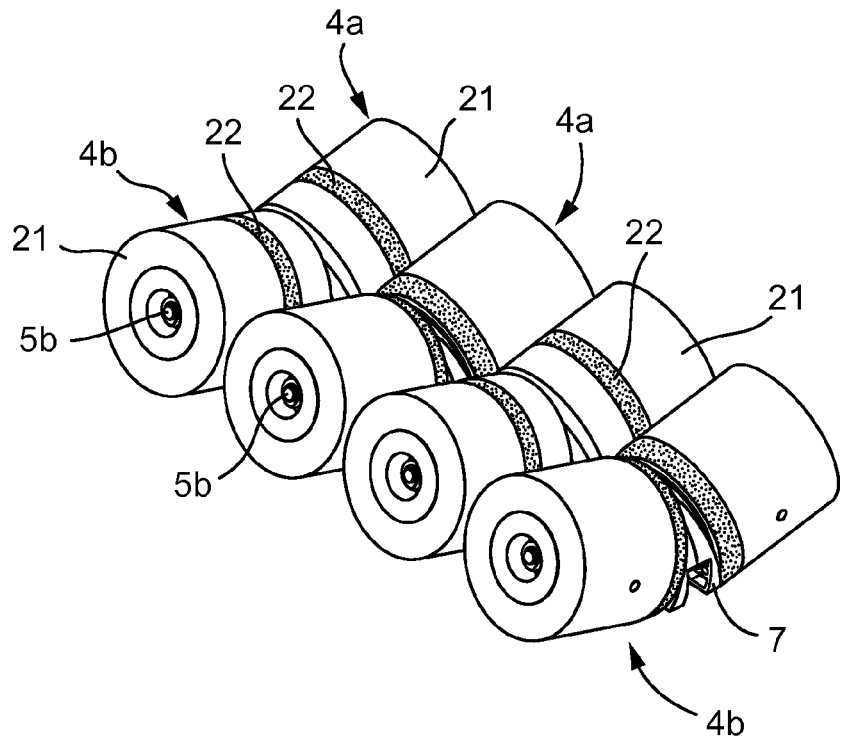
FIG. 3 is similar to FIG. 2, showing a further exemplary embodiment.
Figure 4:
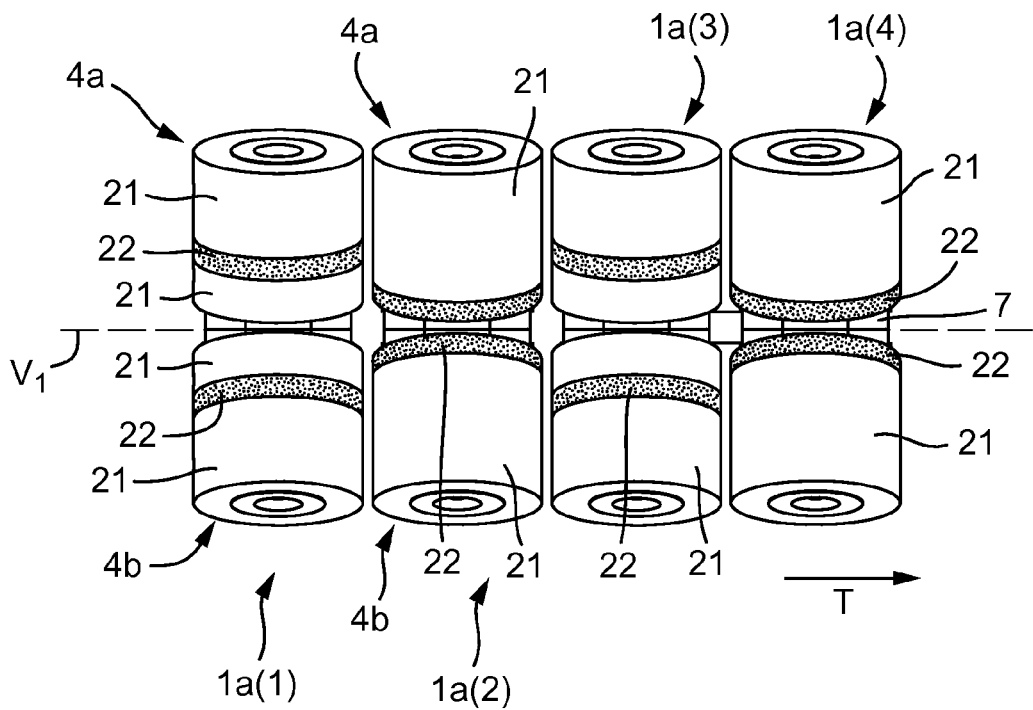
FIG. 4 is a top view of the embodiment of FIG. 3.
Figure 5:
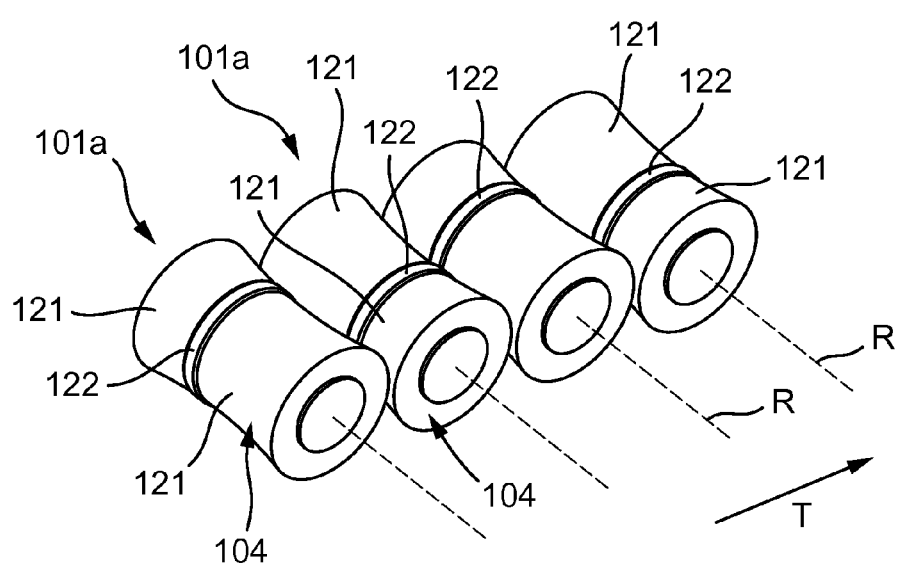
FIG. 5 is a view similar to FIG. 3 of an embodiment wherein the carriers include single rollers.

FIGS. 3-4 show a non-limiting embodiment of the present invention. In this embodiment, at least one of said substantially cylinder-shaped rollers 4 (and in this example each of the rollers 4a, 4b) includes at least a first roller-section 21 and an adjacent second roller-section 22 having mutually different product engagement properties. In this way, improved product engagement can be achieved, particularly for rotating the products P being carried by the rollers 4a, 4b (revolving around their axes of rotation during use).

In a preferred embodiment, each first roller-section 21 of the at least one substantially cylinder-shaped roller 4 is a relatively soft and/or compressible section of the roller. Preferably, the first roller-section 21 can consist of a brush section. As is mentioned before such a brush 21 can include flexible (resilient) brush hairs (not shown in the schematic drawings), extending radially with respect to the axis of rotation 5a, 5b of the respective roller 4a, 4b, outer ends of the hairs e.g. defining a ring-shaped contour in case no product is engaged by the roller (see FIG. 3, 4). The hairs may be evenly distributed, or in groups/bundles of hairs or differently, as will be clear to the person skilled in the art. As an example, a said bundle of hairs may be a slightly tapered or conical bundle, with a centre line of the bundle of hairs extending radially with respect to the axis of rotation of the respective roller.

In this example, each said second roller-section 22 of the at least one substantially cylinder-shaped roller 4 can include a substantially closed contour, for example a ring-shaped surface of a cylinder body 22 (e.g. a solid, massive or hollow cylinder body). On the other hand, a circumferential surface of the first roller-section 21 of the at least one substantially cylinder-shaped roller 4 can be of a relatively open structure, e.g. including apertures, preferably located between flexible elements, for example said brush hairs or said groups of brush hairs.

Also, in a preferred embodiment, providing good product engagement with relatively low chance of damage to the products P, a circumferential surface of a said first roller-section 21 of the at least one substantially cylinder-shaped roller 4a, 4b can have a higher radial compressibility than a radial compressibility of a circumferential surface of the adjacent second roller-section 22 of the respective roller 4.

As follows from the drawing (see FIG. 4), a said second roller-section 22 of the roller 4a, 4b can be located at or near an axially inward (proximal) position of the roller, or at or near the respective first plane V1. A product P being received in a nest, defined by two subsequent carriers 1a, can be supported at least on said second roller-section 22 of the respective rollers 4a, 4b, i.e. at a relatively low location in the nest. The (preferably four) second roller-sections 22 can provide good rolling contact with a product P supported thereby, for rotating the product P during transport (e.g. along a said detecting means Q). By using relatively narrow second roller-sections 22 (extending over only part of the width of respective rollers 4a, 4b), remaining first roller sections 21 can be available for providing relatively soft support to the product, helping in orienting and singulating the product P during pickup or takeover from the product supplier S. Thus, optimized product singulation and rotation with no or significantly less product harm (bruising) can be achieved.

In a further advantageous embodiment, to provide said difference in product engagement, the first and second roller-sections 21, 22 can be made of a different material (e.g. the first roller-sections 21 being made of a first material of compound, and the second roller sections 22 being made of a second material or compound that differs from said first material or compound). Also, it is preferred that contours of the first and second roller-sections 21, 22 have a mutually different rolling resistance.

To obtain improved product engagement, for example, a circumferential outer surface of each said second roller-section 22 can be a surface of a rubber or rubber-like material. For example, a said second roller-section 22 can be manufactured entirely of such a material, or it can include one or more outer layers of such a material. More particularly, each said second roller-section 22 is no brush section, that is, it does not consist of brush hairs.

In the present example, each of the rollers 4 includes two mutually different sections 21, 22. That is however not essential. In an other embodiment, a relatively large number of the rollers 4 (for example at least half of the substantially cylinder-shaped rollers 4) may include the at least two adjacent roller-sections 21, 22 having mutually different product engagement properties. In yet a further embodiment, for each of the product receiving nest at least one of the rollers 4a, 4b defining that nest includes the two mutually different sections 21, 22.

It is preferred that at least two successive carriers in a said row of carriers include rollers that each include at least a first 21 and a second roller section 22, wherein the second roller sections 22 of the at least two successive carriers are located at mutually different axial positions. This is clearly visible in FIG. 4: the two second roller sections 22 of a first carrier 1a(1) are located at different axial positions (namely at a short distance from a proximal inner end of the respective rollers 4a, 4b) than the axial positions of the two second roller sections 22 of the in transport direction subsequent second carrier 1a(2). Similarly, the two second roller sections 22 of that second carrier 1a(2) are located at different axial positions (namely abutting the proximal inner end of the respective rollers 4a, 4b) than the axial positions of the two second roller sections 22 of the, in transport direction T subsequent third carrier 1a(3). In the present example, the second roller sections 22 of the carriers 1a are located at mutually staggered axial positions, when viewed along the transport direction T, such that those second roller sections 22 of neighboring carriers 1a do not overlap. It has been found that this can provide excellent product engagement, particularly compared to an embodiment wherein those second roller sections 22 of neighboring carriers 1a fully overlap (i.e. when they are all located at the same axial positions). In the latter embodiment, it was found that the product engagement could be engaged too good, leading to undesired product misplacement or even product ejection. By using mutually different axial positions of the second roller sections 22 of subsequent carriers, this can be avoided.

In the example, the second roller sections 22 of the rollers 4a, 4b of each carrier 1a are arranged at the same axial position (i.e. measured in parallel with respective roller centre axes 5a, 5b). That is a preferred embodiment, but it is not an essential feature.

As follows from the drawing, some of the rollers can include only two first roller sections 21 and only one second roller section 22. Particularly, in these two carrier rollers the first sections 21 are located at the distal parts and the second sections 22 at the proximal (inward) parts of the roller.

Also, in the example, a number of the rollers 4a, 4b include a single second roller section 22 located between two first roller sections 21. In those rollers, particularly, on of the first roller sections 21 separates the respective second roller sections 22 from an axially inner end of the roller 4a, 4b.

In the example, a total width of the at least first roller section 21 of at least one of said rollers is larger than a total width of the at least one adjacent second roller-section 22 of that roller 4, said widths being measured in axial direction. For example, a width of a said second roller-section 22 is smaller than half of a total width of the respective roller 4a, 4b, particularly smaller than 25% of that total width, for example in the range of about 10-20% of said total width. Thus, relatively narrow second sections 22 can be employed, providing good product engagement with reduced change of hampering overall product singulation.

During operation, the conveyor 1 is being driven, leading to transport of the carriers 1a in the transport direction T and to rotation of the rollers 4a, 4b. Products P are received by an upper part of the endless conveyor 1, to be singulated in the nests that are defined by the carriers 1a. The optional inspection means Q can inspect the singulated products downstream of the product supplier Q in reliable manner due to the improved product singulation and rotation.

FIG. 5 shows an alternative configuration of a row of carriers (only part of the row being shown), wherein each carrier 101a is a single roller 104. In this case, each roller 104 has a substantially diabolo-shape, having a reduced diameter at an axial center with respect to roller diameters at the opposite ends (facing away from each other). The roller 104 can also be shaped differently. In this example, axes of rotation R of the rollers 104 extend normally with respect to a common transport direction T, said axes of rotation being in parallel with one another.

Again, each of the rollers 104 includes a plurality of adjacent roller sections 121, 122, the sections 121, 122 having mutually different product engagement properties (as in the above embodiments). For example, each roller 104 can include a single second roller section 122 that is enclosed between two first roller sections 121. Alternatively, or in addition, one or more of the rollers 104 may include at least two second roller sections 122 that are separated (spaced-apart) by first roller sections 121. As follows from FIG. 5, each second roller section 122 of a (first) carrier is located at different axial position than the axial position of the second roller section 22 of the—in transport direction—subsequent (second) carrier. In other words, the second roller sections 22 of the carriers 1a are located at mutually staggered axial positions, when viewed along the transport direction T, such that those second roller sections 22 of neighboring carriers 1a do not overlap. Thus, the above-mentioned advantages can be achieved.

Although the illustrative embodiments of the present invention have been described in greater detail with reference to the accompanying drawings, it will be understood that the invention is not limited to those embodiments. Various changes or modifications may be effected by one skilled in the art without departing from the scope or the spirit of the invention as defined in the claims.

It is to be understood that in the present application, the term "comprising" does not exclude other elements or steps. Also, each of the terms "a" and "an" does not exclude a plurality. Any reference sign(s) in the claims shall not be construed as limiting the scope of the claims For example, all first sections 21 and all second sections 22 of each said substantially cylinder-shaped rollers 4a, 4b can have circle-cylindrical symmetry (with fixed diameters). In another embodiment, the rollers (and respective roller sections 21, 22) can have other shapes, for example conical or slightly conical (with a varying diameter). For example, a said first sections 21 of a roller 4a, 4b may be conical, or doughnut-shaped, or have another shape. For example, a said second sections 22 of a roller 4a, 4b may be conical, or doughnut-shaped (with a curved outer ring-surface), or have another shape. Also, for example a first 21 and second section 22 of a single roller 4a, 4b can have mutually the same shape (and the same width or a different width), but that is not required.

Besides, a roller, or respective roller section, may have rotation symmetry, but that is not essential. For example, an outer surface of a roller, or of a roller section, may be irregular, angular, egg-shaped or differently, when viewed in a cross-section (normal to a respective roller rotation axis).

The invention claimed is:

1. An apparatus for singulating products supplied in bulk, comprising:
   an endless conveyor which extends in a transport direction, wherein the conveyor is provided with at least one row, extending in the transport direction, of carriers configured such that between each two successive carriers in the row a transport position for a product is formed, wherein each carrier comprises at least one roller, arranged on a respective axis of rotation;
   wherein at least one of said rollers includes at least a first roller-section and an adjacent second roller-section having mutually different product engagement properties, wherein at least two successive carriers in a said row of carriers include respective rollers that each include at least a first and a second roller section, wherein the second roller sections of the at least two successive carriers are located at mutually different axial positions, and wherein contours of the first and second roller-sections have a mutually different rolling resistance.

2. An apparatus according to claim 1, wherein the first roller-section of the at least one roller is a brush section.

3. An apparatus according to claim 1, wherein the second roller-section of the at least one roller includes a substantially closed contour.

4. An apparatus according to claim 1, wherein a circumferential surface of the first roller-section of the at least one roller includes apertures located between flexible elements.

5. An apparatus according to claim 1, wherein a circumferential surface of the first roller-section of the at least one roller has a higher radial compressibility than a radial compressibility of a circumferential surface of the adjacent second roller-section of the respective roller.

6. An apparatus according to claim 1, wherein a said second roller-section of the roller is located at or near an axially inward position of the roller.

7. An apparatus according to claim 1, wherein a circumferential outer surface of said second roller-section is a surface of a rubber material.

8. An apparatus according to claim 1, wherein at least one of the rollers has a circle-cylinder shape, a diameter of an outer circumferential surface of the cylinder being constant.

9. An apparatus according to claim 1, wherein at least one of the rollers has a varying outer diameter.

10. An apparatus according to claim 1, wherein a said first roller-section of the at least one roller has a low-friction outer surface.

11. An apparatus according to claim 1, wherein at least half of the substantially cylinder-shaped rollers includes at least two adjacent roller-sections having mutually different product engagement properties.

12. An apparatus according to claim 1, wherein each carrier comprises two rollers, of which a first is arranged on an associated first axis of rotation and a second on an associated second axis of rotation, wherein a first plane extends vertically and through the middle of the respective row of carriers, wherein said first axis of rotation and the second axis of rotation are each located in a second plane associated with the respective carrier and wherein the first axis of rotation is situated on a first side of the first plane and the second axis of rotation is situated on a second, opposite side of the first plane, wherein the first and the second axis of rotation each include an acute angle with the first plane and extend from the first plane slightly obliquely upwards, with the sum of said acute angles being less than 180°.

13. An apparatus according to claim 1, wherein at least one of said rollers includes only one first roller section and only one second roller section.

14. An apparatus according to claim 1, wherein at least one of said rollers includes only two first roller sections and only one second roller section.

15. An apparatus according to claim 1, wherein a total width of the at least first roller section of at least one of said rollers is larger than a total width of the at least one adjacent second roller-section of that roller, said widths being measured in axial direction.

16. An apparatus according to claim 1, wherein at least one of said carriers includes two rollers, the two rollers of that carrier each including a second roller-section, wherein both second roller sections of the two rollers are located at or near an axially proximal position of the respective roller.

17. An apparatus according to claim 1, wherein the first and second roller-sections are made of a different material.

18. An apparatus according to claim 1, wherein a width of a said second roller-section is smaller than half of a total width of the respective roller.

19. An apparatus according to claim 1, wherein substantially each of said rollers includes at least a said second roller section.

20. Method for singulating products, including supplying the products to an apparatus according to claim 1, wherein the products are received by an upper part of said endless conveyor, the conveyor being driven in a transport direction.

21. An apparatus according to claim 18, wherein the width of a said second roller section is smaller than 25% of the total width.

22. An apparatus according to claim 18, wherein the width of a said second roller-section is in the range of about 10-20% of the total width.

23. An apparatus for singulating products supplied in bulk, comprising:
- an endless conveyor which extends in a transport direction, wherein the conveyor is provided with at least one row, extending in the transport direction, of carriers configured such that between each two successive carriers in the row a transport position for a product is formed, wherein each carrier comprises at least one roller, arranged on a respective axis of rotation;
- wherein at least one of said rollers includes at least a first roller-section and an adjacent second roller-section having mutually different product engagement properties, wherein at least two successive carriers in a said row of carriers include respective rollers that each include at least a first and a second roller section, wherein the second roller sections of the at least two successive carriers are located at mutually different axial positions, and wherein at least one of the rollers has a circle-cylinder shape, a diameter of an outer circumferential surface of the cylinder being constant.

24. An apparatus for singulating products supplied in bulk, comprising:
- an endless conveyor which extends in a transport direction, wherein the conveyor is provided with at least one row, extending in the transport direction, of carriers configured such that between each two successive carriers in the row a transport position for a product is formed, wherein each carrier comprises at least one roller, arranged on a respective axis of rotation;
- wherein at least one of said rollers includes at least a first roller-section and an adjacent second roller-section having mutually different product engagement properties, wherein at least two successive carriers in a said row of carriers include respective rollers that each include at least a first and a second roller section, wherein the second roller sections of the at least two successive carriers are located at mutually different axial positions, and wherein the first and second roller sections are made of a different material.

* * * * *